United States Patent [19]

Freehauf

[11] 4,130,849
[45] Dec. 19, 1978

[54] INDEXED MEMORY COORDINATOR

[76] Inventor: Millard F. Freehauf, 135 W. Colfax Ave., Roselle Park, N.J. 07204

[21] Appl. No.: 800,559

[22] Filed: May 25, 1977

[51] Int. Cl.$^2$ .............................................. G11B 5/00
[52] U.S. Cl. .................................................. 360/137
[58] Field of Search ................. 360/137, 12, 91, 92; 35/35 C; 179/100.11, 100.1 DR

[56] References Cited
U.S. PATENT DOCUMENTS

| | | | |
|---|---|---|---|
| 3,073,041 | 1/1963 | Haban | 35/35 C |
| 3,109,898 | 11/1963 | Gray | 360/92 |
| 3,140,360 | 7/1964 | Whitworth | 360/91 X |
| 3,177,594 | 8/1965 | Demo | 35/35 C |
| 3,200,516 | 8/1965 | Parker | 35/35 C |
| 3,521,010 | 7/1970 | Sato | 360/137 |

Primary Examiner—John H. Wolff
Attorney, Agent, or Firm—Lerner, David, Littenberg and Samuel

[57] ABSTRACT

An indexed memory coordinator is disclosed which includes a master unit and one or more slave units connected thereto. Each of the units, master and slave, includes a compartment for receiving a recording tape cassette along with an associated record/play head and a motor for driving the tape. The master unit alone contains all of the electronic circuitry for controlling the heads and motors for all the units. All the units are interconnected in parallel via plugs and jacks to the common circuitry in the master unit. Additionally, each unit includes a switch mechanism for conditioning that unit into either the record or playback mode, and when in such a mode, the unit utilizes the common circuitry in the master unit for driving its motor and tape heads.

1 Claim, 6 Drawing Figures

INDEXED MEMORY COORDINATOR

BACKGROUND OF THE INVENTION

This invention relates to recording devices and, more particularly, to a multi-unit recording device wherein the individual units are readily indexed.

In business establishments, there exists a need for leaving messages for persons not immediately present in the office. For example, a particular individual may be in and out of the office during the day and while that individual is out of the office, there may be a number of telephone calls requiring the individual's attention when he returns to the office. It is not uncommon for a single telephone operator or secretary to take all the messages for a large number of different individuals. Typically, such message taking has been done by writing the message on, for example, a large blackboard, a piece of paper, or individual slips or paper. These prior methods present distinct disadvantages. For example, using a common blackboard or piece of paper, an individual has no privacy regarding regarding incoming messages. When using individual slips of paper, such slips are easily misplaced or lost. It is therefore apparent that a need exists for a more efficient way of taking messages.

There are also many instances where an individual would like to record a thought that comes to mind, which thought may be totally unrelated to the work at hand. These different thoughts that occur during the course of a day may be in different unrelated categories. The individual having the thoughts may then wish to record same on separate slips of paper which may then be placed, for example, in separate files or envelopes assigned to the different categories for future retrieval. Again, such slips of paper have a tendency to be misplaced or lost. It is therefore apparent that a need exists for more efficient ways of recording ideas in different categories.

It is therefore an object of the present invention to provide efficient indexable apparatus for recording categorized thoughts or messages.

It is another object of this invention to provide such apparatus for recording voice messages.

It is a further object of this invention to provide such apparatus which is expandable to any desired number of categories or individuals.

It is yet another object of this invention to provide such an expandable indexed apparatus which is relatively economical.

It is yet a further object of this invention to provide such an economical expandable indexed apparatus which comprises a master unit and a plurality of slave units, each of the slave units having a minimum amount of component parts therein, with the master unit containing the bulk of the component parts.

SUMMARY OF THE INVENTION

The foregoing and additional objects are attained in accordance with the principles of this invention by providing an indexed memory coordinator comprising: a plurality of recording units, each including means adapted to receive an audio recording medium and each further including means responsive to recording signals applied thereto for storing information on said recording medium; a microphone for converting sound to audio signals; means responsive to said audio signals applied thereto for generating said recording signals; and switching means operable to couple said microphone to said recording signal generating means and to selectively apply said recording signals to a selected one of said plurality of recording units.

In accordance with an aspect of this invention, the apparatus includes a master unit and a plurality of slave units, the master unit including all the circuitry necessary for driving the audio recording mediums in all of the units, both master and slave, and the slave units are all interconnected in parallel with the master unit via a common bus system.

In accordance with another aspect of this invention, the parallel interconnection of all the units is achieved via compatible plugs and jacks so that as many slave units as are desired may be stacked onto the master unit.

DESCRIPTION OF THE DRAWING

The foregoing will be more readily apparent upon reading the following description in conjunction with the drawing in which.

DESCRIPTION OF THE PREFERRED EMBODIMENT

Figure 1:
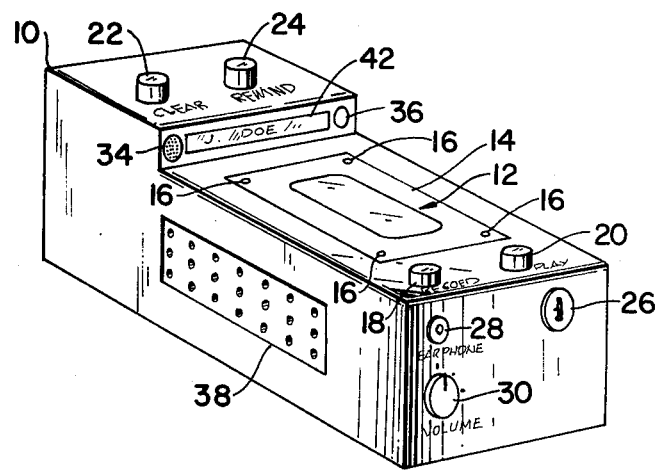
FIG. 1 depicts a perspective view from the left front corner of an illustrative master unit constructed in accordance with the principles of this invention.
Figure 2:
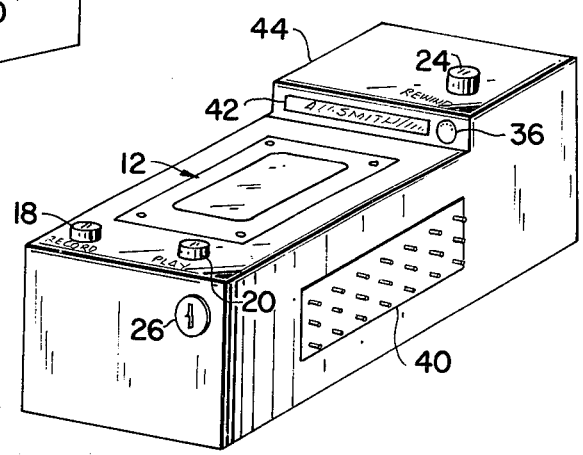
FIG. 2 depicts a perspective view from the right front corner of an illustrative slave unit constructed in accordance with the principles of this invention.
Figure 3:
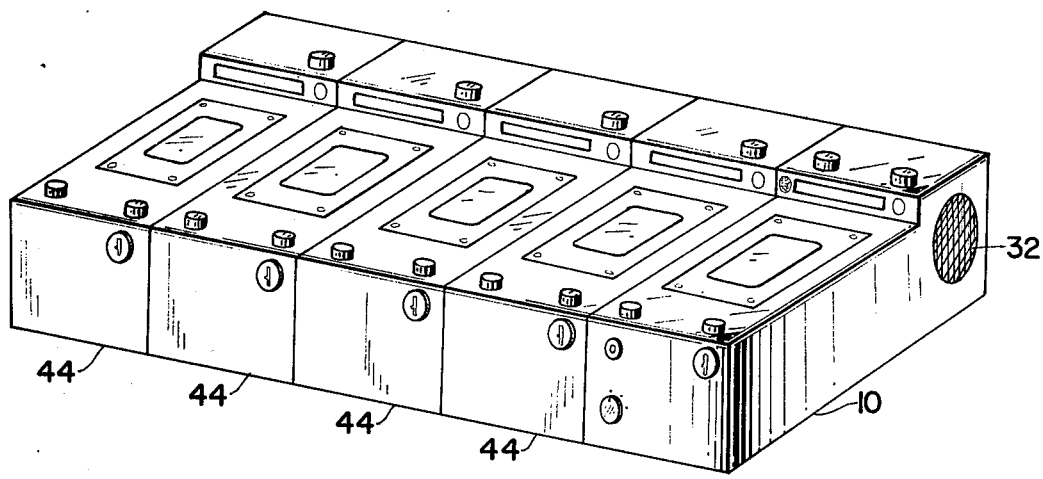
FIG. 3 depicts a perspective view from the right front corner of an indexed memory coordinator comprising a master unit in accordance with that depicted in FIG. 1 and a plurality of slave units such as those depicted in FIG. 2 interconnected together.

Referring now to the drawing, and in particular to FIGS. 1, 2 and 3, shown therein are perspective views of an indexed memory coordinator constructed in accordance with the principles of this invention. FIG. 1 shows the master unit of the coordinator. The master unit is enclosed within an outer case or housing 10. The master unit includes a tape compartment 12 having a cover member 14, illustratively secured to housing 10 by means of screws 16. The purpose of screws 16 is to discourage the removal of recording tape from tape compartment 12. Preferably, tape compartment 12 is suitably adapted to receive a standard tape cassette. It is understood that tape compartment cover member 14 may be closed in some other suitable manner than by means of screws 16, for example, by a spring loaded mechanism such as is normally encountered in a cassette recorder/player.

The master unit also includes a record button 18 which is depressed when it is desired to record on the tape within compartment 12 and a play button 20 which is depressed when it is desired to play what is stored on the tape within compartment 12. Button 18 is illustratively spring loaded so that recording only takes place when the button is held in a depressed condition, the button returning to is normal position when released. Play button 20 may be similarly arranged or alternatively may be released either at the end of the tape or when the clear button 22 or the rewind 24 are depressed. A lock 26 may be provided to prevent unauthorized persons from operating the play button, so that privacy of messages is assured.

The master unit also includes an earphone jack 28 which may be utilized for privacy listening, and a volume control knob 30 to control the playback volume. The master unit is also provided with an external speaker 32 (FIG. 3) for listening when privacy is not desired.

A microphone 34 on the master unit is utilized when recording on the tape within compartment 12, either of the master unit or any of the slave units. Indicator light 36 is adapted to be lit, and to stay lit, when record button 18 is depressed. Female jack assembly 38 is provided so that slave units may be interconnected to the master unit via a compatible male plug assembly 40 (FIG. 2). A name plate 42 is provided on housing 10, which is utilized for identifying, or indexing, the category of message being recorded on that particular unit. For example, name plate 42 may have thereon the name of the individual to whom the messages are addressed, or, alternatively, the category of thought which is to be recorded on that unit.

FIG. 2 shows a slave unit which externally is similar to the master unit shown in FIG. 1. The slave unit is enclosed in outer casing or housing 44. On one side of housing 44, as shown in FIG. 2, is a plug assembly 40 compatible with jack assembly 38. On the other side of housing 44, not shown in FIG. 2, is a jack assembly identical to jack assembly 38 (FIG. 1) so that multiple slave units may be interconnected and stacked onto the master unit, as shown in FIG. 3. Like the master unit, each slave unit includes a tape compartment 12, a record button 18, a play button 20, a rewind button 24, a lock 26, an indicator light 36, and a name plate 42. The slave units, however, do not include a microphone, an external speaker, an earphone jack, a clear button, or a volume control knob. As will be described in detail hereinafter, the slave units each include record-/playback tape heads and a motor for driving the tape, but do not include any of the electronic circuitry for recording or playing, or a power supply for the motor. Only the master unit contains such circuitry. Although FIG. 1 shows a master unit which includes a tape compartment, it is understood that a master unit could be supplied which only includes the circuitry, and the only units which would have tape compartments would be the slave units. As will become apparent from the description which follows, a single master unit can have virtually an unlimited number of slave units interconnected thereto, the number of slave units only being limited by physical space constraints.

Figure 4:
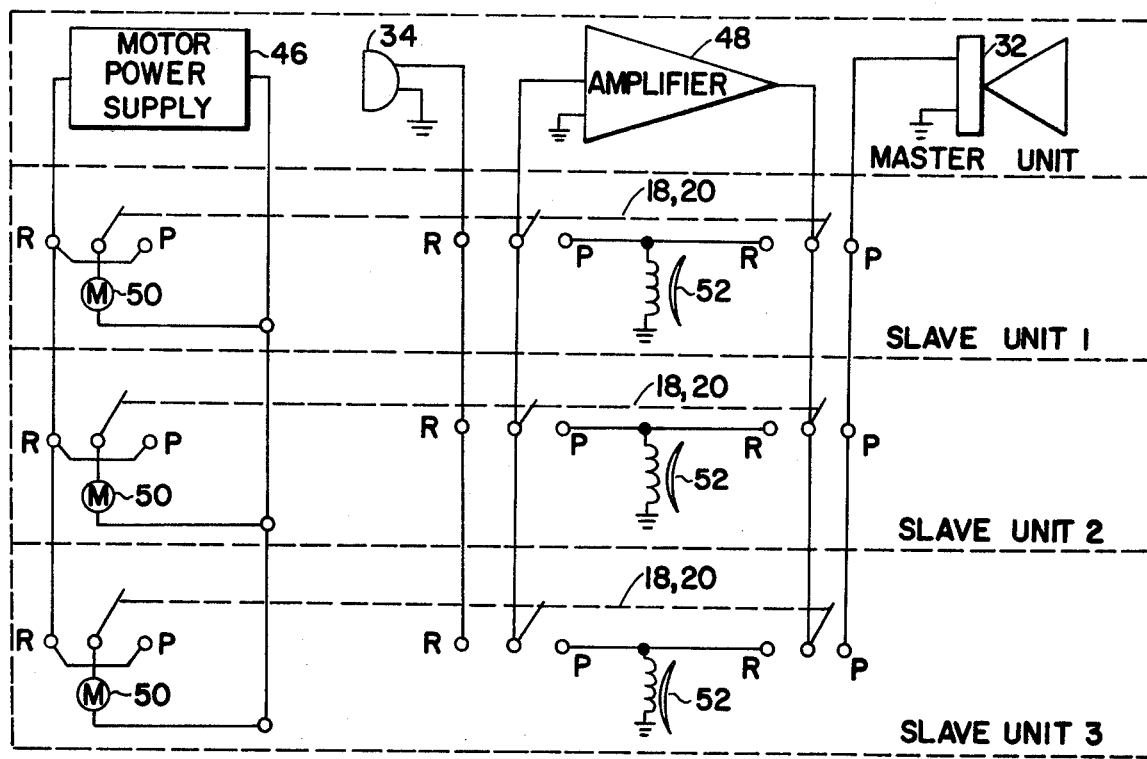
FIG. 4 functionally depicts the switching mechanism and the interconnection of the master and slave units.

Referring now to FIG. 4, functionally depicted therein is the switching mechanism and an interconnection diagram of the master and slave units showing how the major components are connected. In FIG. 4, the master unit is shown without any recording capability, but it is understood that an actual master unit may incorporate the master unit and slave unit 1, enclosed within a single housing.

The master unit includes speaker 32, microphone 34, motor supply 46, and amplifier 48, as well as other circuit components not necessary for an understanding of this invention. Each of the slave units includes a motor 50 for driving the tape within a corresponding tape compartment 12 and a record/playback head 52 which functions in the well-known manner to selectively record on, or read from, its corresponding tape. As is apparent from FIG. 4, all the slave units are interconnected in parallel. The record and play switches 18 and 20 for each unit are shown as being a bank of toggle switches with center returns. When the record switch on a particular slave unit is operated, the motor 50 within that slave unit is actuated to drive the tape within the unit. At the same time, microphone 34 is connected to the input of amplifier 48 and the corresponding record/playback head 52 is connected to the output of amplifier 48. When the play switch in a particular slave unit is operated, motor 50 is again actuated. The corresponding record/playback head 52 is now connected to the input of amplifier 48 and speaker 32 is connected to the output of amplifier 48. Although only three slave units are shown in FIG. 4, it is readily apparent that any number of slave units may be interconnected in the manner shown in FIG. 4.

Figure 5:
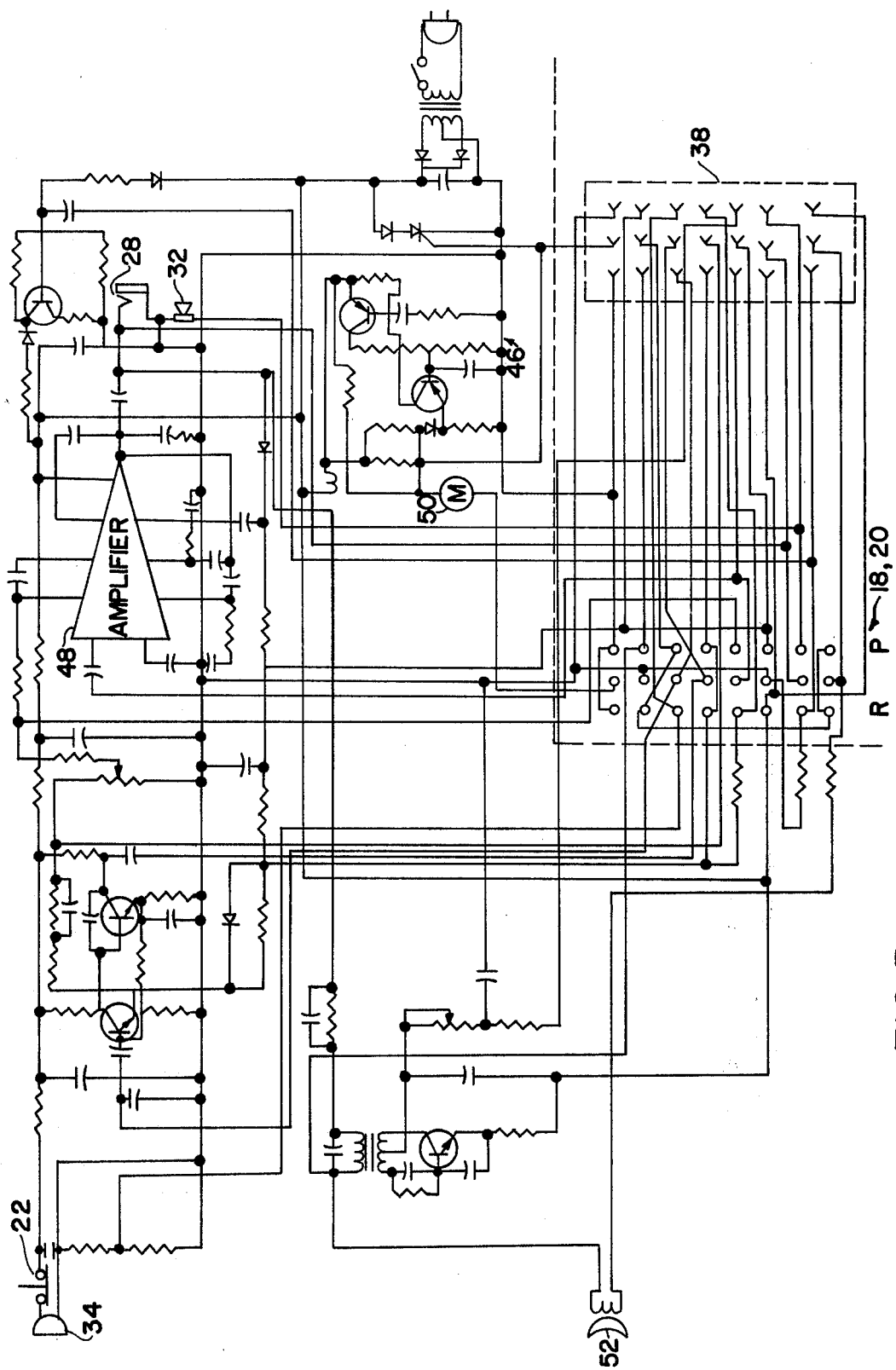
FIG. 5 depicts an illustrative schematic circuit diagram for the master unit shown in FIG. 1.

Referring now to FIG. 5, shown therein is an illustrative circuit diagram for a master unit which functionally contains the elements shown in the master unit and slave unit 1 of FIG. 4. Above the dashed line in FIG. 5 is circuitry which may be found in a typical tape cassette recording unit. In particular, the circuitry shown therein is from Model 2629 compact portable cassette recorder manufactured by Craig Corporation of Compton, California. No further description of this circuitry will be given since such does not form a part of the present invention. It is expressly understood that this invention is not limited to the particular recorder shown in FIG. 5. Below the dashed line in FIG. 5 are the jack assembly 38 and the record and play switches 18, 20, showing their connections to the various points of the common circuitry. Illustratively, jack assembly 38 includes 21 jacks and record and play switch assembly 18, 20 is a bank of eight single pole, double throw toggle switches which are off in the central position with a spring return to the center.

As shown in FIG. 5, the common circuitry utilized for all the units includes microphone 34, volume control 30, amplifier 48, earphone jack 28, speaker 32, and motor power supply 46. In addition, clear button 22 may be utilized to open the microphone circuit and is designed to be pushed in conjunction with the record switch of a slave unit whose tape it is desired to erase. It also is seen from FIG. 5 that the master unit includes its own motor 50, indicator light 36, and record/playback head 52.

Figure 6:
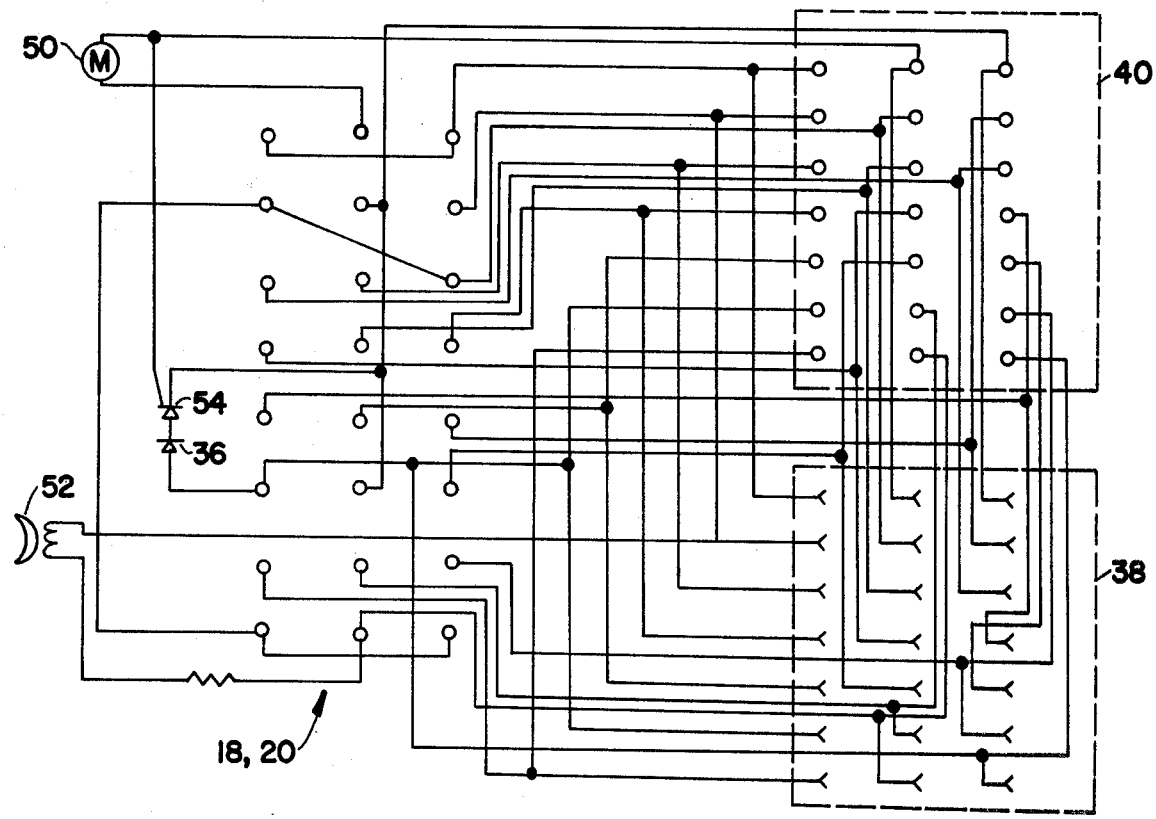
FIG. 6 depicts an illustrative schematic circuit diagram of a slave unit such as that depicted in FIG. 2.

FIG. 6 depicts the circuitry within a typical slave unit. A slave unit includes a jack assembly 38, a plug assembly 40, a record and play switch assembly 18, 20, a record/playback head 52, an indicator light 36, and a motor 50. Additionally, the only other circuitry is a silicon controlled rectifier (SCR) 54 utilized to turn on indicator light 36 (illustratively a light emitting diode), a resistor associated with the tapehead 52, and wires interconnecting the bank of switches and the plug and jack assemblies.

It is therefore apparent from viewing FIGS. 5 and 6 that various points in the common circuitry of the master unit are connected along a common bus system through all of the slave units and when it is desired to utilize a slave unit for either recording or playing, the corresponding switch assembly of that slave unit couples the slave unit's tapehead and motor to the common circuitry through the bus system. Any desired number of slave units may be added by merely stacking the units via the plug and jack assemblies.

Accordingly, there has been described an indexed memory coordinator constructed in accordance with the principles of this invention. Although this invention has been disclosed with reference to a preferred embodiment, numerous other variations, modifications and adaptations of the present invention will be apparent to those skilled in the art and such as come within the spirit and scope of the appended claims are considered to be embraced by the present invention.

What is claimed is:

1. An indexed memory coordinator for selective recording on a plurality of recording media comprising:
   a plurality of recording units, each including means adapted to receive one of said audio recording media and each further including means responsive to recording signals applied thereto for storing information on said one recording medium, and means for reading information stored on said recording medium to generate information signals, and means for actuating said reading means;
   a microphone for converting sound to audio signals;
   means responsive to said audio signals applied thereto for generating said recording signals, said recording signal generating means being incorporated in a master unit which includes means for converting said information signals into audible signals, and each of said plurality of recording units being incorporated in a respective one of a plurality of slave units;
   switching means operable to couple said microphone to said recording signal generating means and to selectively apply said recording signals to a selected one of said plurality of recording units, said switching means including common bus means for interconnecting said master unit and said plurality of slave units, and further including a plurality of switch units each coupled between said common bus means and a respective one of said plurality of slave units, wherein each of said switch units includes a switch selectively operable to a first state, a second state, and a third state, said switch in said first state applying said recording signals to the corresponding one of said storing means, said switch in said second state applying information signals from the corresponding reading means to said converting means, said switch being arranged to return to said third state when not operated to said first or second state so as to disconnect the associated recording unit from the common bus means when in said third state.

* * * * *